Figure 1:
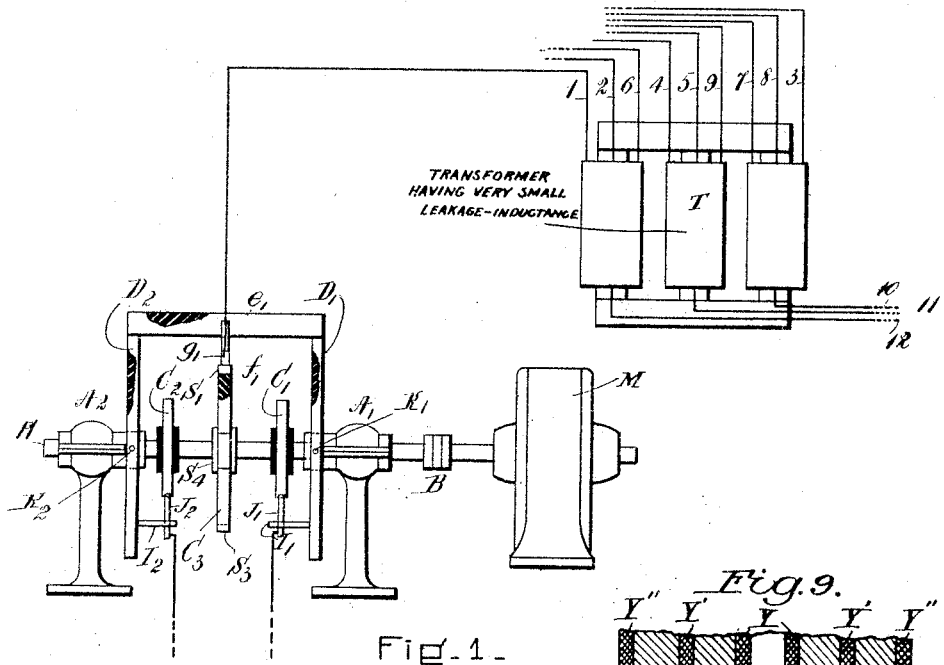

S. CABOT.
ELECTRIC CONVERSION.
APPLICATION FILED AUG. 22, 1912.

1,191,759.

Patented July 18, 1916.
4 SHEETS—SHEET 1.

WITNESSES:
Patrick J. Conroy
Beatrice I. Smith

INVENTOR:
Sewall Cabot
by Browne & Wadsworth
Attys.

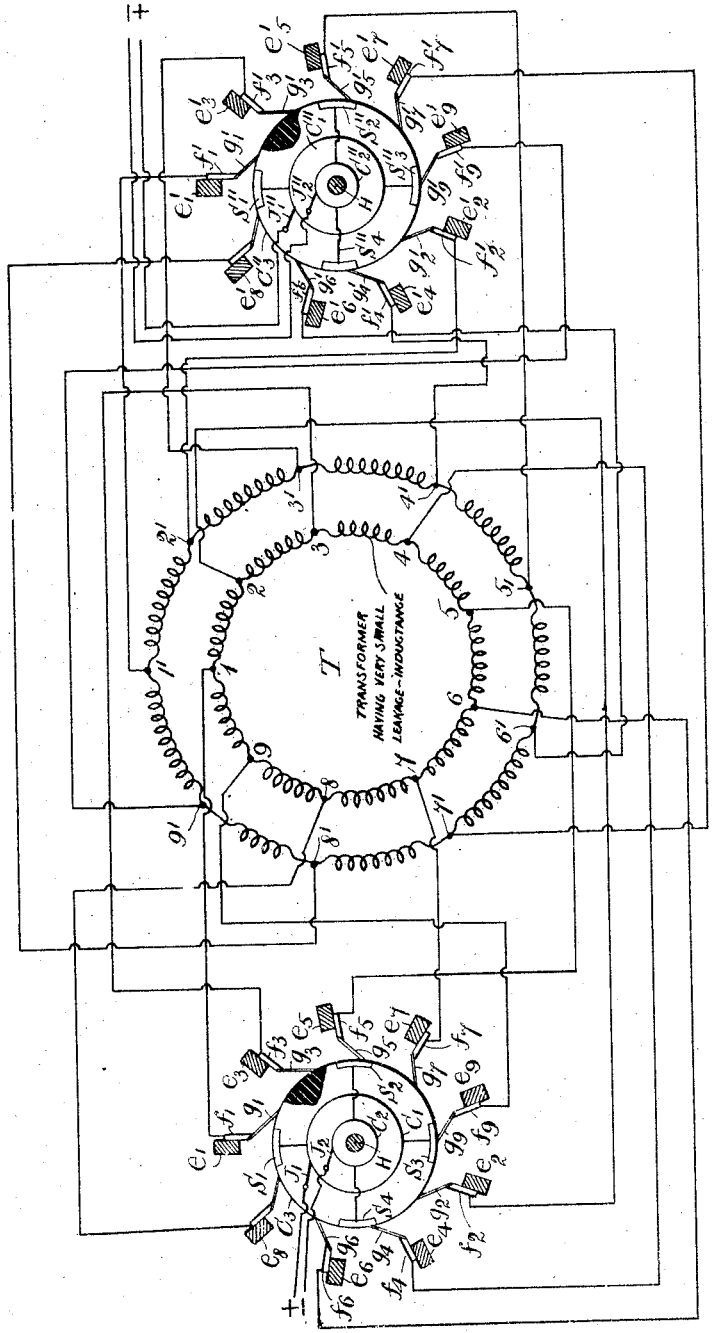

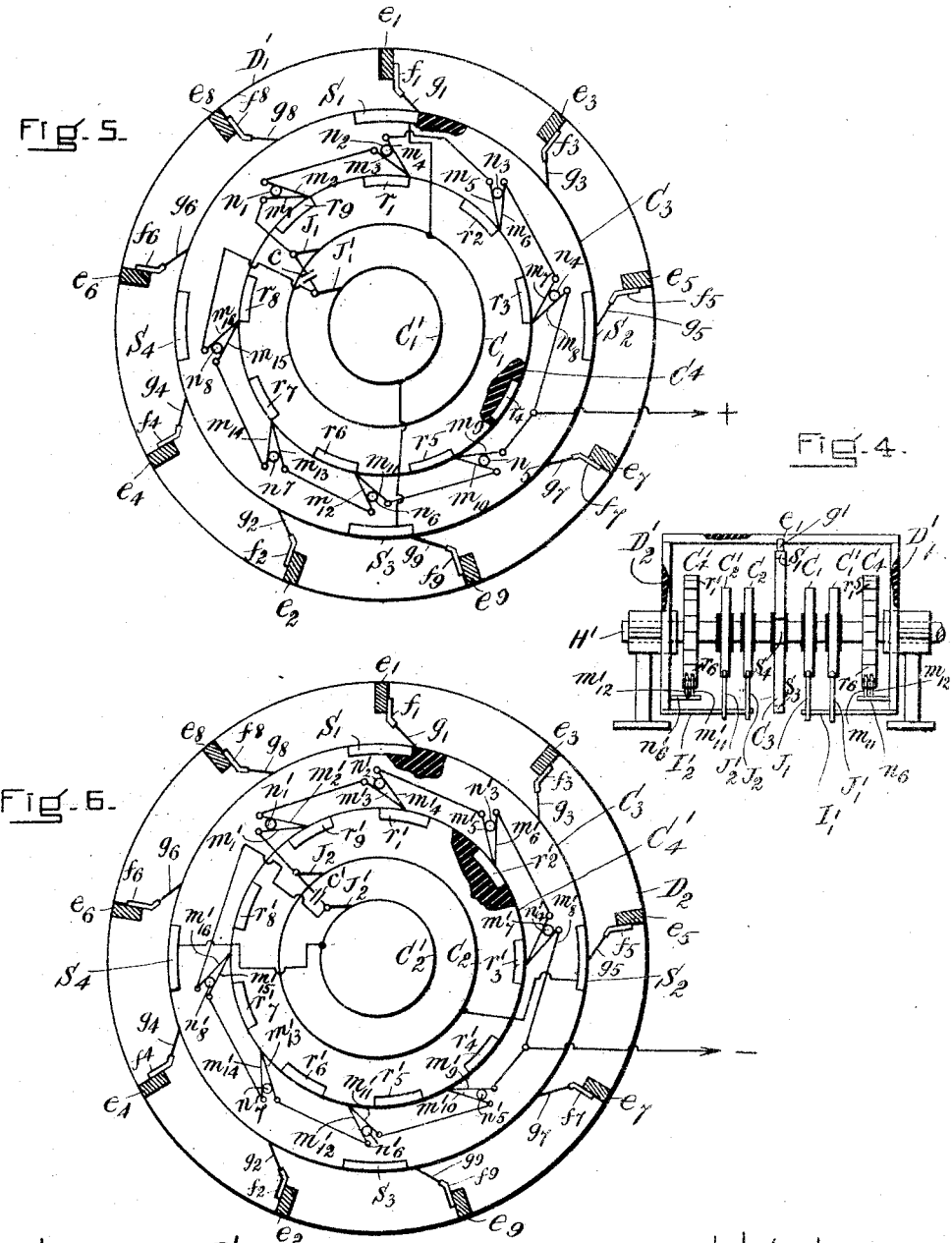

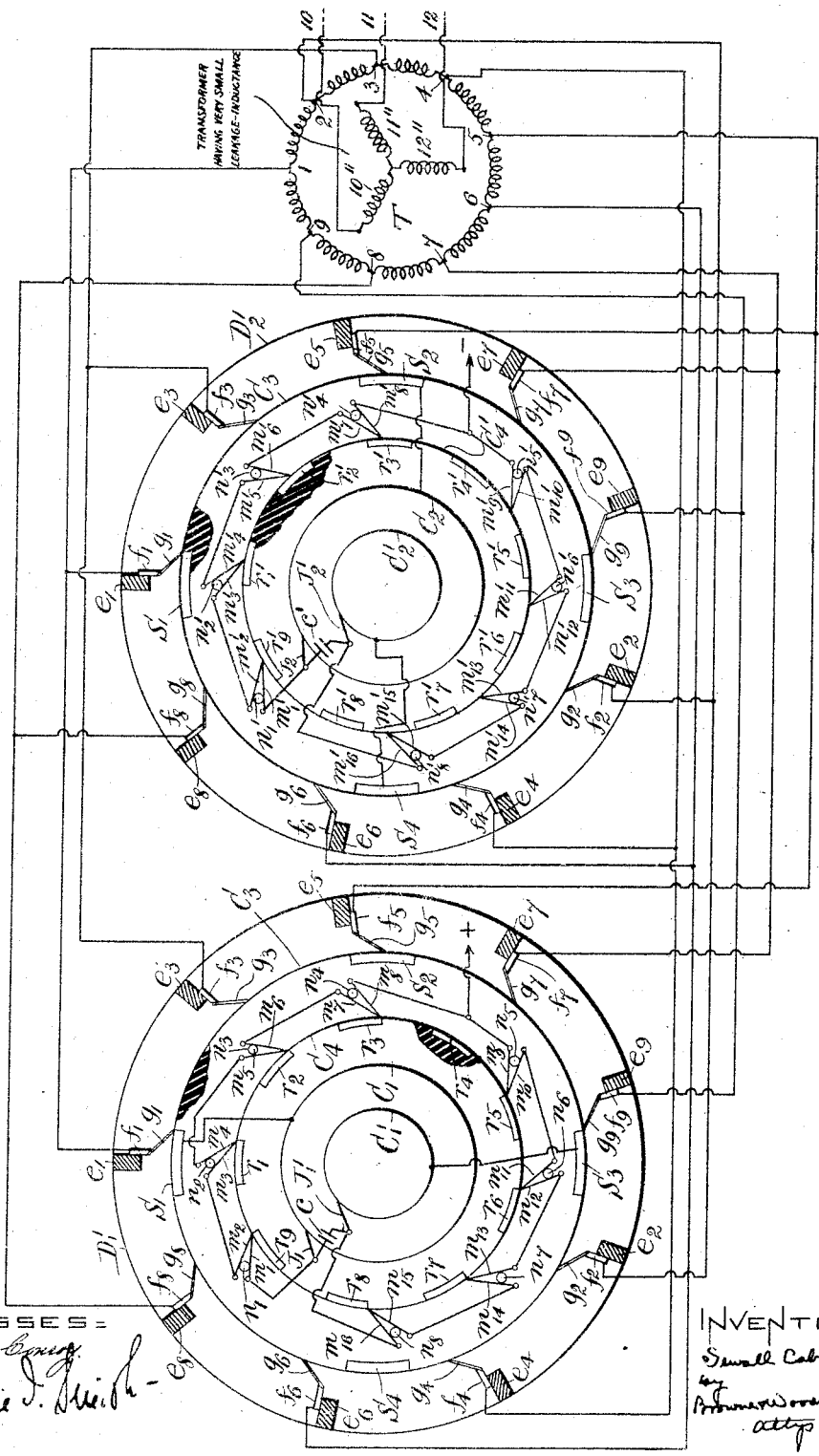

UNITED STATES PATENT OFFICE.

SEWALL CABOT, OF BROOKLINE, MASSACHUSETTS.

ELECTRIC CONVERSION.

1,191,759.　　　　Specification of Letters Patent.　　Patented July 18, 1916.

Application filed August 22, 1912.　Serial No. 716,359.

*To all whom it may concern:*

Be it known that I, SEWALL CABOT, citizen of the United States, and resident of Brookline, in the county of Norfolk and State of Massachusetts, have invented a new and useful Improvement in Electric Conversion, of which the following is a specification.

My invention relates to the conversion of polyphase current to direct current and vice versa and also to the conversion of direct current at one potential to direct current at another potential, by polyphase commutation.

The object of my invention is to provide a system of polyphase commutation wherein the necessity for shifting the angle of commutation under varying loads to prevent undue sparking is obviated.

I am aware that systems of polyphase commutation are old, but so far as I am advised they have never come into commercial use because the necessity for shifting the angle of commutation with changes of load to prevent sparking has rendered them impracticable. I have discovered, however, that if the transformer employed be designed to have sufficiently small leakage-inductance, which, as herein explained, is the coefficient of magnetic-leakage, such necessity for shifting the brushes with varying loads is obviated, as hereinafter more fully set forth.

In the drawings which accompany and form a part of this specification I have illustrated several forms of apparatus and arrangements of circuits whereby the foregoing objects may be realized.

Figure 9:
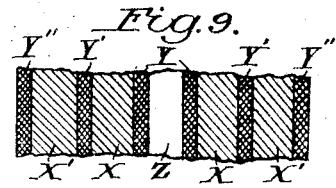
Figure 2:
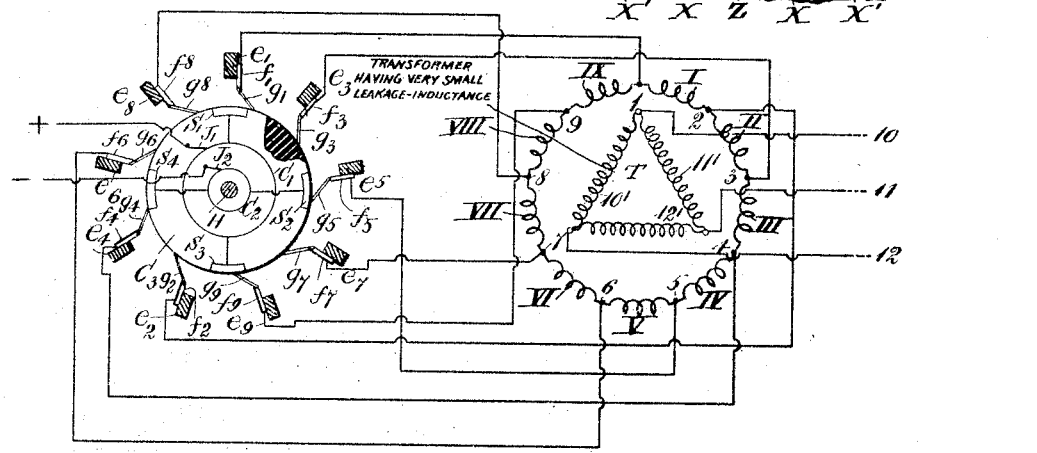

In the drawings,—Figure 1 is a front elevation of one embodiment of my invention, from which certain details, viz., the cross-bars $e_2 \ldots e_9$ and their associated brushes and brush-holders, have been omitted for the sake of clearness. Fig. 2 is a diagram showing one arrangement of circuits that may be employed in connection with the apparatus shown in Fig. 1 for converting polyphase alternating current, 3-phase current in this particular instance, into direct current, or vice versa. Fig. 3 is a diagram of a modification showing one arrangement of circuits whereby direct current at one potential may be converted into direct current at another potential in accordance with the principle of my invention. Fig. 4 is a front elevation of a modification of the apparatus shown in Fig. 1, from which certain details, viz., the cross-bars $e_2 \ldots e_9$ and their associated brushes and brush-holders, as well as the brush-holders $n_1$ $n_1'$ etc., and their brushes $m_1$, $m_1'$, etc., have been omitted for the sake of clearness. Fig. 5 is a diagram showing one method of electrically connecting the several parts which constitute the righthand portion of the apparatus illustrated in Fig. 4, and Fig. 6 is a diagram showing one method of electrically connecting the similar parts which constitute the lefthand portion of said apparatus. Fig. 7 is a plan showing one arrangement of brushes and brush-holders associated with the disk $D_1'$. Fig. 8 is a diagram of a complete system showing one arrangement of circuits that may be employed in connection with the apparatus shown in Fig. 4 for converting polyphase current, 3-phase current in the present instance, to direct current and vice versa. Fig. 9 is a fragmentary view showing in central longitudinal section a portion of one of the transformer cores and its associated primary and secondary windings.

In the particular drawings selected for more fully illustrating my invention, M represents a 4-pole self-starting synchronous motor connected by the flexible coupling B to the shaft H rotating in the journals $A_1$ $A_2$. Mounted upon said journals are the supporting members $D_1$ $D_2$ herein shown as disks preferably of insulating material which are arranged to be adjusted about said journals and held in adjusted position by the set screws $K_1$ $K_2$, respectively, thus constituting the equivalent of rocker arms. Collector rings $C_1$ $C_2$ are mounted to rotate with the shaft H and are insulated therefrom. Brush-holders $I_1$ $I_2$, supported on the disks $D_1$ $D_2$, respectively, carry brushes $J_1$ $J_2$ which make contact with the collector rings $C_1$ $C_2$ respectively and constitute the DC terminals of the apparatus, said brushes and rings forming a collecting device. The shaft H also carries an insulating disk $C_3$, in the periphery of which are set a plurality of contact segments $S_1$ $S_2$ $S_3$ $S_4$, each shown in the present instance as twenty degrees in circumferential length and spaced ninety degrees apart from center to center. The segments $S_1 S_3$ are connected to the collector ring $C_1$ and the segments $S_2 S_4$ to the collector ring $C_2$. Supported by the disks $D_1 D_2$ and equally spaced around the perimeters thereof are a plurality of horizontal supports $e_1 \ldots e_9$. In the present instance nine such supports are shown spaced forty degrees apart from center to center. The horizontal supports carry brush-holders $f_1 \ldots f_9$, respectively, and brushes $g_1 \ldots g_9$ are secured to their respective brush-holders. The brushes $g_1 \ldots g_9$ are connected to the 9-phase terminals $1 \ldots 9$ respectively of the transformer T adapted to change polyphase current of one system to polyphase current of another system, and herein shown as a 3-phase, 9-phase transformer, having its 3-phase windings 10' 11' 12' connected to the leads 10, 11, 12, respectively. It will be understood of course that while I have shown the windings 10' 11' 12' in triangular connection, they may be employed in star connection without departing from the principle of my invention. The transformer T preferably is a constant potential transformer having, in the present instance, three magnetic circuits around which are distributed, in the manner hereinafter set forth, windings for changing symmetrical 3-phase currents to symmetrical 9-phase currents. The transformer T is designed, as hereinafter more fully described, to have its leakage-inductance or coefficient of magnetic-leakage sufficiently small to render unnecessary the shifting of the angle of commutation with varying loads to prevent sparking at the commutator $C_3$.

The operation of the system above described is as follows: To transform constant potential 3-phase current to constant potential direct current, the motor M is started, a source of 3-phase current is connected through resistance to the terminals 10, 11, 12, and the disks $D_1 D_2$ adjusted about the journals until the point of minimum sparking is reached. The resistance may then be removed and a constant potential direct current drawn from the brushes $J_1 J_2$ without the necessity for altering the adjustment of said disks in order to prevent sparking at the commutator $C_3$ for varying loads up to the full rated output of the transformer. In other words, by virtue of the small leakage-inductance of the transformer the polyphase current may be sparklessly commutated for all loads within the rated output of said transformer with fixed brushes or a fixed angle of commutation. To convert direct current to 3-phase current, the motor M (which is not necessarily a synchronous alternating current motor in this case) is started and the direct current source connected to the brushes $J_1 J_2$. Constant potential 3-phase current may then be drawn from the terminals 10, 11, 12, having a frequency numerically equal to twice the speed of the motor in revolutions per second. Here again, by virtue of the small leakage-inductance of the transformer the apparatus will operate sparklessly for all loads within the rated output of the transformer with a fixed angle of commutation. If it is desired to transform direct current of one potential to direct current of another potential, a second polyphase winding may be wound on the cores of the transformer T in place of the 3-phase winding. This second polyphase winding is in all respects similar to that shown in Fig. 2 with the exception that the turns of its windings may be more, or less, numerous than those of the first 9-phase winding, the ratio of the turns of the two windings determining the ratio of transformation desired.

In Fig. 3 the terminals of the second polyphase winding, herein shown as a 9-phase winding, are shown at $1' \ldots 9'$ and each is connected with one of the brushes $g_1' \ldots g_9'$ supported respectively by the horizontal bars $e_1' \ldots e_9'$ of an apparatus identical with that shown in Fig. 1. This apparatus comprises brushes $J_1'', J_2''$ which make contact respectively with the collector rings $C_1'' C_2''$ and said collector rings are connected respectively with the segments $S_1'' S_3''$ and $S_2'' S_4''$ carried by the commutator $C_3''$. This apparatus is carried by standards similar to those shown at $A_1 A_2$ in Fig. 1 and preferably is located on the other side of the motor M, the shaft H of which carries the several collector rings $C_1 C_2$, $C_1'' C_2''$ and the commutator disks $C_3 C_3''$. In the present instance the second 9-phase winding is shown as having more turns per winding than the first 9-phase winding, so that when direct current of a given potential is supplied to the brushes $J_1 J_2$, a direct current of higher potential may be drawn from the brushes $J_1'' J_2''$.

I will now proceed to explain what I believe to be the principle of operation of the apparatus and system of circuits above described.

Polyphase alternating current having a small number of phases, such for example, as 3-phase current employed in the commercial distribution of electrical energy, is changed to polyphase current having a relatively large number of phases by means of a constant potential transformer having its cores and its primary windings each numerically equal to the smaller number of phases and its secondary windings numerically equal to the larger number of phases. The secondary windings are properly distributed about the cores as hereinafter described and are connected in series in the usual well known manner. Their turns are so proportioned as to form a symmetrical $n$-phase system connected in polygon. The vectorial angles and magnitudes of the $n$-phases may then be represented by an equilateral polygon having $n$-sides. The voltage of each winding obviously will be zero twice per cycle and if two connections shifting synchronously with the terminals of said $n$-phase windings are so adjusted that said windings are successively short-circuited each at the instant in the cycle when its voltage is zero, a maximum fluctuating unidirectional difference of potential will exist between said connections. For example, if as in the present case selected for illustration, $n$ is taken as nine, the fluctuation will be 1.5 per cent. and the value of the direct current voltage will approximate four times the root-mean-square value of any one of the nine phases. A direct current voltage which fluctuates only 1.5 per cent. may be considered as unfluctuating for all practical purposes, and will cause a practically-unfluctuating direct current to flow in a working circuit. Associated with the secondary windings of the $n$-phase transformer is the commutator $C_3$ rotated by a synchronous motor M which is energized by the same current that energizes the primary of said transformer. The commutator, together with its coöperating brushes, with which it has relative synchronous motion, thus provides the said synchronously shifting connections, whereby constant potential practically-unfluctuating direct current may be obtained. Somewhat analogous phenomena occur in the direct current dynamo in which the armature windings form a symmetrical $n$-phase system connected in polygon and equipped with a commutator and brushes between which exists relative synchronous motion. The brushes in this case are so adjusted that each phase is commutated at the instant of zero potential.

So far as I am aware, systems analogous to that described above in connection with Figs. 1, 2 and 3, have not been commercially successful because of a prohibitive amount of sparking at the commutator which occurred unless the brushes were adjusted for variations in load. I have discovered that this difficulty resulted from the unsuitable design of the transformers employed. I have found, however, that the problem is not exactly the same as in the direct current generator, because in the latter the inductance between adjacent commutator segments contains energy stored by the load current, and this energy must be dissipated and re-stored while the winding is short-circuited in order to secure sparkless commutation. This inductance, causing reactance voltage, which is the fundamental source of trouble, can be reduced only by increasing the number of armature windings and commutator segments for a given voltage. However, in the case of the polyphase transformer, the flux produced by the load current in any of the secondary windings, is to a certain extent neutralized by the flux produced in the same place by the action of the current in the primary or supply circuit. The resultant inductance, I have found to be the leakage inductance of the transformer referred to one of the $n$-phase windings commutated. In the case of my polyphase transformer described herein the flux produced by the load current in any given place is to a very large extent neutralized by the flux produced in the same place by the action of the current in the primary of the supply circuit. The resultant inductance is the leakage-inductance of the transformer referred to one of its $n$-phase windings and its magnitude in henries is determined by the following equation $$L' = 4\pi n^2 \frac{p}{l}\left(g + \frac{S}{3} + \frac{P}{3}\right)10^{-9}$$

in which $n$=the number of turns in an $n$-phase winding, $p$=the mean perimeter of the $n$-phase winding in centimeters, $g$=the separation of primary and secondary windings in centimeters, $P$=the thickness of the primary winding in centimeters, $S$=the thickness of the secondary winding in centimeters, and $l$=the length of the windings in centimeters.

Magnetic leakage or leakage-induction is equal to the product of magnetomotive force by the reciprocal of the reluctance of the magnetic circuit. The equation given above for leakage inductance will be seen to be equal to magnetic leakage or leakage induction multiplied by the number of turns and divided by the current. It has the same form as the expression for the coefficient of self-induction, commonly called inductance, viz., $$L = \frac{\varphi n}{I}$$

where $\varphi$ is the flux, $n$ the number of turns, and I the current. The factor $L'$, which I term the "leakage inductance," is the coefficient of magnetic leakage or leakage induction. This factor multiplied by the direct current in an $n$-phase winding and divided by the time in seconds that each phase is short-circuited by the "shifting connections" above referred to, gives the "reactance voltage", and said voltage must be neutralized by an equal and opposite voltage in order to secure sparkless commutation or reversal of said current. Heretofore in polyphase commutation systems, such voltage necessary to neutralize the reactance voltage was secured by shifting the angle of commutation. By means of the present invention, I am enabled to secure sparkless commutation for all loads within the rated output of the transformer without shifting the angle of commutation.

If it were possible to construct the transformer with an inappreciable leakage-inductance, it would be possible to handle loads even higher than the rated output of the transformer without ever shifting the angle of commutation and furthermore, brushes of inappreciable resistance might then be used, thus eliminating the element which has heretofore caused the bulk of the losses in prior attempts to operate polyphase commutation systems. While it is probably impossible to construct a transformer having such negligible leakage inductance, nevertheless I have made and successfully operated in the system above described a transformer having sufficiently small leakage inductance to render unnecessary the shifting of the angle of commutation to secure sparkless commutation for all loads within the rated output of the transformer. The transformer which I prefer to employ differs from those now in commercial use in certain features whereby the leakage inductance is reduced to a minimum without decreasing its efficiency or rendering its manufacturing cost prohibitive. For a given rating this transformer has a greater ratio of length to diameter of winding than the usual commercial transformer and also has a larger ratio of iron to copper. The voltage per turn is greater than in the usual transformer and all of the inductively-associated primary and secondary windings on each core are sandwiched or mutually interleaved to the greatest possible extent so as to distribute them in as nearly even a manner as possible throughout the same position in space. To accomplish this result I use a maximum of iron, a maximum of voltage per turn, and a minimum of copper. I make the windings as long as feasible, and I sandwich or mutually interleave the primary and secondary windings in a manner well understood by those skilled in the art of transformer-design, to the maximum extent feasible. The relative proportion of all the inductively-associated windings in each unit area of a central longitudinal section of a properly designed winding will be the same, provided of course that such areas are each sufficiently large to include both primary and secondary turns. For example, if in a given unit area in a certain part of said section, $x$ per cent. is occupied by the primary winding, $y$ per cent. by polyphase winding No. 1 and $z$ per cent. by polyphase winding No. 2, etc.,—then in all other differently located unit areas in said section, $x$ per cent. will be occupied by the primary turns, $y$ per cent. by secondary winding No. 1 and $z$ per cent. by secondary winding No. 2, etc. This of course represents the ideal condition and my invention contemplates as close an approximation thereto as is possible. This insures that the primary and secondary load fluxes shall be developed in the same position in space, so that the one will neutralize the other as completely as possible, because, of course the inducing and induced currents are necessarily in opposite directions.

It is of course well understood by those skilled in the art that magnetic leakage in a transformer may be reduced by sandwiching the primary and secondary windings. Heretofore in single phase transformers no occasion arose for reducing the leakage-reactance, (the product of leakage-inductance by frequency) to more than about ten per cent. of the load resistance, for any further reduction obviously would be immaterial since the leakage impedance varies according to the square root of the sum of the squares of the leakage-reactance and load-resistance. Therefore no material gain was secured in reducing magnetic leakage beyond a certain minimum in single-phase alternating current transformers. The reason for the excessive reduction of leakage-inductance in my polyphase transformer is founded on my discovery that the difficulty in securing polyphase commutation may be decreased proportionately to the reduction of leakage-inductance, and on the further discovery that sparkless commutation with a fixed angle of commutation for varying loads is possible when the leakage-inductance is sufficiently small. Heretofore, in the proposed systems of polyphase commutation of the prior art, no one has been able to reduce the reactance voltage, which as above set forth is caused by the leakage inductance, to less than 5.27 volts per phase, whereas in my system it is not larger than .75 volt per phase and the recognized permissible maximum is 2 volts when the angle of commutation is not automatically shifted.

In the appended claims I use the term "transformer having very small leakage-inductance" as meaning a transformer having a leakage inductance sufficiently small that all loads within the rated output of the transformer can be handled without undue sparking and without shifting the angle of commutation.

I have found the apparatus shown in the drawings especially suitable for relatively high DC potentials, for the reason that the high potential 9-phase terminals are separated by a considerable air-space at all times except the instant when the potential difference is substantially zero.

I have constructed the apparatus shown in Figs. 1 and 2 to transform 220-volt, 60-cycle, 3-phase AC to 80,000-volt DC, which worked in a satisfactory manner for producing Röntgen rays without shifting the commutation angle, for all loads up to $\tfrac{1}{16}$ amperes. In order more fully to disclose my invention, I will give the values used in this case, which, so far as I am aware, is the first instance that as great a power as 16 K. W. has been attained with direct current at voltages of this magnitude. The dimensions of the apparatus were as follows: The diameter of $C_3$ was 18″. The diameter of $C_1$ $C_2$ was 14″. The space between $C_1$ or $C_2$ and $C_3$ was 10″. The weight of iron in transformer T was 200 lbs. The weight of copper in transformer T was 30 lbs. The volts per turn were three. The windings of transformer T consisted of two high potential sections X, X′ (Fig. 9) sandwiched between three low potential sections Y, Y′, Y″, on each core Z, each said high potential section containing the layers of those secondaries that were wound on the core in question and each said low potential section containing the layers of the primary winding that surrounded said core. The length of each core was about 8″, its diameter about 3″ and the overall diameter of each core and winding was about 6″. As shown in Fig. 1, there was one primary for each core, each primary having its entire length wound on one core, and, as shown in Figs. 1 and 2, each core had the whole of one secondary and portions of four others wound thereon, the diagram of the transformer in Fig. 2 showing, as is customary, the vector positions of the phases in question, as well as the connections of the windings. It will be noted that in Fig. 1 three conductors 1, 2 and 6 are shown as extending from the windings associated with one core to connect the same with the brushes of the commutator. As shown in Fig. 2, conductor 1 is connected between secondaries IX and I, conductor 2 between secondaries I and II and conductor 6 between secondaries V and VI. Therefore it follows that the whole of secondary I and parts of secondaries IX, II, V and VI are wound on one core. Referring to Fig. 1, conductors 4, 5 and 9 extend from the windings on the second core, and by reference to Fig. 2 it will be seen that conductor 4 is connected between secondaries III and IV, conductor 5 between secondaries IV and V, and conductor 9 between secondaries VIII and IX. Therefore it follows that the whole of secondary IV and parts of secondaries III, V, VIII and IX are wound on the second core. Conductors 7, 8 and 3 are shown in Fig. 1 as extending from the windings associated with the third core, and by reference to Fig. 2 it will be seen that conductor 7 is connected between secondaries VI and VII, conductor 8 between secondaries VII and VIII, and conductor 3 between secondaries II and III. Therefore it follows that the whole of secondary VII and parts of secondaries VI, VIII, II and III are wound on the third core.

It is to be understood, of course, that my invention is not limited to the use of a phase-changing transformer of this type, for as will be obvious, any other suitable transformer, many types of which are well known, may be employed. Whatever the type employed, it is essential that its leakage inductance be made very small as explained above, by distributing all of the inductively-associated primary and secondary windings on each core in as nearly even a manner as possible throughout the same position in space, so that each integral portion of the secondary winding is distributed in as nearly even a manner as possible throughout the same position in space surrounding its core as is occupied by its inductively associated primary winding, in contradistinction, for example, to a transformer for converting two-phase current to twelve-phase current in which a primary coil is extended over both cores and the whole of a twelve-phase coil is wound on only one core, the inductively related primary and secondary coils, in such case, not being distributed evenly throughout the same position in space surrounding the core and the leakage-inductance of the transformer, consequently, being large.

I have found it possible to increase the maximum load that can be handled without undue sparking and with a fixed angle of commutation by means of the above described apparatus modified as shown in Fig. 4. In Fig. 4 the rotating members $C_4$ $C_4'$ perform the function of simultaneously connecting and disconnecting the direct current terminals (marked + and − in Figs. 5, 6 and 8) to and from the 9-phase terminals, through the intermediary of the commutator $C_3$ at a plurality of points in series, thereby employing the principle of "serial sub-division" described and claimed in my United States Letters Patent No. 917,749, granted April 13, 1909. In Fig. 4, four collector-rings $C_1$ $C_1'$ and $C_2$ $C_2'$ are connected respectively to the segments $S_1$ $S_3$ and $S_2$ $S_4$ set into the commutator $C_3$, as shown in Figs. 5 and 6. Brushes $J_1$ $J_1'$ are carried by a suitable arm $I_1'$ on the disk $D_1'$ and brushes $J_2$ $J_2'$ are carried by a similar arm $I_2$ carried by the disk $D_2'$, or they may be carried on any of the horizontal supports shown in Figs. 4, 5 and 6. The brushes $J_1$ $J_1'$ $J_2$ $J_2'$ make contact respectively with the collector rings $C_1$ $C_1'$ $C_2$ $C_2'$, respectively, which are mounted on but insulated from the shaft H′, which is driven as in Fig. 1 by a synchronous motor. The disks $C_4$ $C_4'$ are of insulating material and each carries a plurality of segments $r_1 \ldots r_9$, $r_1' \ldots r_9'$, respectively, herein shown as nine in number, each twenty degrees in circumferential length. Upon the edge of the disk $C_4$ bear brushes $m_1 \ldots m_{16}$ mounted respectively pair by pair on insulating brush-holders $n_1 \ldots n_8$, which are supported by the disk $D_1'$, and similar brushes $m_1' \ldots m_{16}'$ mounted respectively pair by pair on insulating brush-holders $n_1 \ldots n_8'$ supported by the disk $D_2'$ bear upon the edge of the disk $C_4'$. The disks $C_4$ $C_4'$ are made wide enough, as shown in Fig. 7, to allow the brushes to be mounted in pairs side by side with a small gap between them. These brushes obviously will be electrically connected when resting on a conducting segment $r_1$, etc. or $r_1'$, etc., and disconnected when resting on the edge of the disk itself. In this manner a circuit through four pairs of brushes is made and broken simultaneously at eight places in series. At the instant of rotation shown in Fig. 5, the polyphase terminal 1 connected to brush $g_1$ is about to be connected to the $+$ DC terminal through $S'$ $C_1$ $J_1$ $m_1$ $r_9$ $m_2$ $m_3$ $r_1$ $m_4$ $m_5$ $r_2$ $m_6$ $m_7$ $r_3$ $m_8$; and polyphase terminal 9 connected to brush $g_9$ is about to be disconnected from the $+$ DC terminal through $S_3$ $C_1'$ $J_1'$ $m_{16}$ $r_8$ $m_{15}$ $m_{14}$ $r_7$ $m_{13}$ $m_{12}$ $r_6$ $m_{11}$ $m_{10}$ $r_5$ $m_9$. At the same moment, in Fig. 6, polyphase terminal 5 connected to brush $g_5$ is connected to the $-$ DC terminal through $S_2$ $C_2$ $J_2$ $m_1'$ $r_9'$ $m_2'$ $m_3'$ $r_1'$ $m_4'$ $m_5'$ $r_2'$ $m_6'$ $m_7'$ $r_3'$ $m_8'$. At this instant the polyphase winding between terminals 9 and 1 is about to be commutated, as shown in Fig. 8. The next commutation to occur will be that of the winding between the polyphase terminals 5 and 6 and this is accomplished by a 10° clockwise rotation from the position shown. The result obtained by applying the principle of "serial subdivision" in this manner is to cause an E. M. F. of relatively large amount to be developed for a relatively short period of time. The direction of this E. M. F. is such as will reverse the flow of current in the polyphase winding being commutated, a "break" E.M.F. opposing the current creating it, so that when the stored energy to be commutated is relatively small, sparking does not occur, the necessary dissipation of energy presumably taking place in the form of eddy-currents; but when this energy is relatively large, sparking does occur at the points of interruption. However, I have found it possible to greatly reduce this sparking by slightly prolonging the length of the segments $S_1$ $S_2$ $S_3$ $S_4$ and connecting two condensers $c$ $c'$ whose value may best be determined by experiment between the brushes $J_1$ $J_1'$ and $J_2$ $J_2'$, respectively. In this case the energy involved presumably passes from the magnetic field of the winding commutated into the dielectric of the condenser and thence back into the magnetic field in the form of an equal current in the reverse direction, the phenomenon being substantially that of a natural electric half oscillation.

In Fig. 8 which shows the complete system described in connection with Figs. 4, 5, 6 and 7, the primaries 10" 11" 12" of the transformer T are shown in star connection, although of course it will be readily understood that the triangular connection may be employed as shown in Fig. 2.

The operation of the system shown in Fig. 8 is identical with that above described in connection with Figs. 1, 2 and 3, as will be obvious from comparison of Figs. 2 and 8.

It will be understood that various modifications may be made both in the apparatus and circuit connections herein shown and described without departing from the principle of my invention.

I claim:—

1. An electric conversion system comprising in combination, a source of polyphase current having a given number of phases, a transformer having a very small leakage-inductance adapted to change said current to polyphase current having a greater number of phases, a commutator and a plurality of brushes associated therewith for successively short-circuiting the secondaries of said transformer, means for creating relative motion between said commutator and brushes in synchronism with said current, a plurality of conductors connecting the secondaries of said transformer with said brushes, and means for taking off the resulting practically-unfluctuating direct current from said commutator.

2. An electric conversion system comprising in combination, a source of polyphase current having a given number of phases, a transformer having very small leakage-inductance adapted to change said current to polyphase current having a greater number of phases, and means for converting said last-mentioned polyphase current into practically-unfluctuating direct current, said means comprising apparatus for simultaneously connecting or disconnecting at a plurality of points in series the direct current circuit to or from the secondaries of said transformer.

3. An electric conversion system comprising in combination, a source of polyphase current of one system, a transformer having very small leakage-inductance adapted to change said current to polyphase current of a different system, a commutator, a plurality of brushes therefor, means for creating relative motion between said commutator and brushes in synchronism with said current, a plurality of conductors connecting the secondaries of said transformer with said brushes, and means for taking off the resulting practically-unfluctuating direct current from said commutator, said means comprising apparatus for simultaneously connecting or disconnecting at a plurality of points in series the direct current circuit to or from the secondaries of said transformer.

4. An electric conversion system comprising in combination, a source of polyphase current, a transformer having very small leakage-inductance, connections from the primaries of said transformer to said source, a commutator, a collecting device and brushes for successively short-circuiting the secondaries of said transformer and thereby converting said polyphase current into practically-unfluctuating direct current, and means for adjusting the position of said brushes with respect to said commutator.

5. An electric conversion system comprising in combination, a source of polyphase current of one system, a transformer having very small leakage-inductance adapted to change said current into polyphase current of a different system, a commutator, a collecting device and brushes for successively short-circuiting the secondaries of said transformer and thereby converting said polyphase current into practically-unfluctuating direct current, and means for adjusting the position of said brushes with respect to said commutator.

6. An electric conversion system comprising in combination, a source of polyphase current of one system, a transformer having very small leakage-inductance adapted to change said current to polyphase current of a different system, a commutator, a plurality of brushes therefor, means for creating relative motion between said commutator and brushes in synchronism with said current, a plurality of conductors connecting the secondaries of said transformer with said brushes, means for taking off the resulting practically-unfluctuating direct current from said commutator, said means comprising apparatus for simultaneously connecting or disconnecting at a plurality of points in series the direct current circuit to or from the secondaries of said transformer, and means for connecting a condenser to each secondary during the commutation thereof.

7. An electric conversion system comprising in combination, a source of polyphase current having a given number of phases, a transformer having very small leakage-inductance adapted to change said current to polyphase current having a greater number of phases, means for converting said last-mentioned polyphase current into practically-unfluctuating direct current, said means comprising apparatus for simultaneously connecting or disconnecting at a plurality of points in series the direct current circuit to or from the secondaries of said transformer, and means for connecting a condenser to each secondary during the commutation thereof.

8. An electric conversion system comprising in combination, a source of direct current, means for converting the energy of said direct current into polyphase energy, a transformer having very small leakage-inductance for changing the potential of said polyphase energy, and means associated with the secondaries of said transformer comprising a collecting device for successively short-circuiting the latter and thereby converting said polyphase energy into practically-unfluctuating direct current energy having a potential different from that of said source.

9. An electric conversion system, comprising in combination, a source of polyphase current of one system, a transformer adapted to change said current to polyphase current of a different system, and means connected with the secondaries of said transformer comprising a collecting device for successively short-circuiting the latter and thereby converting said last-mentioned polyphase current into practically unfluctuating direct current, said transformer having a leakage-inductance sufficiently small that said polyphase current may be sparklessly commutated for all loads within the rated output of said transformer with a fixed angle of commutation.

10. An electric conversion system comprising in combination, a source of polyphase current having a given number of phases, a transformer for changing said current into polyphase current having a greater number of phases, and means connected with the secondaries of said transformer comprising a collecting device for successively short-circuiting the latter and thereby converting said last-mentioned polyphase current into practically-unfluctuating direct current, said transformer having a leakage-inductance sufficiently small that said polyphase current may be sparklessly commutated for all loads within the rated output of said transformer with a fixed angle of commutation.

11. An electric conversion system comprising in combination, a source of polyphase current having a given number of phases, a transformer adapted to change said current to polyphase current having a greater number of phases, a commutator and a plurality of brushes associated therewith for successively short-circuiting the secondaries of said transformer, means for creating relative motion between said commutator and brushes in synchronism with said current, a plurality of conductors connecting the secondaries of said transformer with said brushes, and means for taking off the resulting practically-unfluctuating direct current from said commutator, said transformer having a leakage-inductance sufficiently small that said polyphase current may be sparklessly commutated for all loads within the rated output of said transformer with a fixed angle of commutation.

12. An electric conversion system comprising in combination, a source of polyphase current having a given number of phases, a transformer adapted to change said current to polyphase current having a greater number of phases, said transformer having a leakage-inductance sufficiently small that said polyphase current may be sparklessly commutated for all loads within the rated output of said transformer with a fixed angle of commutation, and means for converting said last-mentioned polyphase current into practically-unfluctuating direct current, said means comprising means for simultaneously connecting or disconnecting at a plurality of points in series the direct current circuit to or from the secondaries of said transformer.

13. An electric conversion system comprising in combination, a source of polyphase current of one system, a transformer adapted to change said current to polyphase current of a different system, said transformer having a leakage-inductance sufficiently small that said polyphase current may be sparklessly commutated for all loads within the rated output of said transformer with a fixed angle of commutation, a commutator, a plurality of brushes therefor, means for creating relative motion between said commutator and brushes in synchronism with said current, a plurality of conductors connecting the secondaries of said transformer with said brushes, and means for taking off the resulting practically-unfluctuating direct current from said commutator, said means comprising means for simultaneously connecting or disconnecting at a plurality of points in series the direct current circuit to or from the secondaries of said transformer.

14. An electric conversion system comprising in combination, a source of polyphase current, a transformer, connections from the primaries of said transformer to said source, a commutator, a collecting device and brushes for successively short-circuiting the secondaries of said transformer and thereby converting said polyphase current into practically-unfluctuating direct current, and means for adjusting the position of said brushes with respect to said commutator, said transformer having a leakage-inductance sufficiently small that said polyphase current may be sparklessly commutated for all loads within the rated output of said transformer with a fixed angle of commutation.

15. An electric conversion system comprising in combination, a source of polyphase current of one system, a transformer adapted to change said current into polyphase current of a different system, a commutator, a collecting device and brushes for successively short-circuiting the secondaries of said transformer and thereby converting said polyphase current into practically-unfluctuating direct current, and means for adjusting the position of said brushes with respect to said commutator, said transformer having a leakage-inductance sufficiently small that said polyphase current may be sparklessly commutated for all loads within the rated output of said transformer with a fixed angle of commutation.

16. An electric conversion system comprising in combination, a source of polyphase current of one system, a transformer adapted to change said current to polyphase current of a different system, a commutator, a plurality of brushes therefor, means for creating relative motion between said commutator and brushes in synchronism with said current, a plurality of conductors connecting the secondaries of said transformer with said brushes, and means for taking off the resulting practically-unfluctuating direct current from said commutator, said means comprising apparatus for simultaneously connecting or disconnecting at a plurality of points in series the direct current circuit to or from the secondaries of said transformer, said transformer having a leakage-inductance sufficiently small that said polyphase current may be sparklessly commutated for all loads within the rated output of said transformer with a fixed angle of commutation.

17. An electric conversion system comprising in combination, a source of polyphase current having a given number of phases, a transformer adapted to change said current to polyphase current having a greater number of phases, means for converting said last-mentioned polyphase current into practically-unfluctuating direct current, said means comprising apparatus for simultaneously connecting or disconnecting at a plurality of points in series the direct current circuit to or from the secondaries of said transformer, and means for connecting a condenser to each secondary during the commutation thereof, said transformer having a leakage-inductance sufficiently small that said polyphase current may be sparklessly commutated for all loads within the rated output of said transformer with a fixed angle of commutation.

18. An electric conversion system comprising in combination, a source of direct current, means for converting the energy of said direct current into polyphase energy, a transformer for changing the potential of said polyphase energy, and means associated with the secondary of said transformer for converting said polyphase energy into practically-unfluctuating direct current energy having a potential different from that of said source, said transformer having a leakage-inductance sufficiently small that said polyphase energy may be sparklessly commutated for all loads within the rated output of said transformer with a fixed angle of commutation.

19. An electric conversion system comprising in combination, a source of polyphase current, means for converting the same into practically-unfluctuating direct current, and means for simultaneously connecting or disconnecting at a plurality of points in series the direct current circuit to or from said source of polyphase current.

20. An electric conversion system comprising in combination, a source of polyphase current having a plurality of windings, means for commutating said windings to convert said polyphase current into practically-unfluctuating direct current, means for simultaneously connecting or disconnecting at a plurality of points in series the direct current circuit to or from said source of polyphase current, and means for connecting a condenser to each of said windings during the commutation thereof.

21. An electric conversion system comprising in combination, a source of polyphase current, a transformer, connections from the primaries of said transformer to said source, and means connected with the secondaries of said transformer comprising a collecting device for successively short-circuiting the latter and thereby converting said polyphase current into practically-unfluctuating direct current, said transformer having a leakage-inductance sufficiently small that said polyphase current may be sparklessly commutated for all loads within the rated output of said transformer with a fixed angle of commutation.

22. An electric conversion system comprising in combination, a source of polyphase current having a given number of phases, a transformer having very small leakage-inductance for changing said current to polyphase current having a greater number of phases, said transformer having all of its inductively-associated primary and secondary windings on each core sandwiched or mutually interleaved and evenly distributed throughout the same position in space, and means for converting the last mentioned polyphase current into practically-unfluctuating direct current, said means comprising means for successively short-circuiting the secondaries of said transformer and apparatus for simultaneously connecting or disconnecting at a plurality of points in series the direct current circuit to or from said secondaries.

23. An electric conversion system comprising in combination, a source of electrical energy, a transformer having a relatively small number of cores, means causing said energy to establish a polyphase magnetic flux in said cores, windings about said cores for changing the potential of said energy, said windings constituting a symmetrical polyphase system connected in polygon and having a relatively large number of phases, and a commutator electrically connected with said windings for successively short-circuiting the secondaries of said transformer, said transformer having all of its inductively-associated primary and secondary windings on each core sandwiched or mutually interleaved and evenly distributed throughout the same position in space, whereby a sufficiently small leakage-inductance is obtained to allow sparkless commutation for all loads within the rated output of the transformer with a fixed angle of commutation.

24. An electric conversion system comprising in combination, a source of electrical energy, a transformer having a relatively small number of cores, means causing said energy to establish a polyphase magnetic flux in said cores, windings about said cores for changing the potential of said energy, said windings constituting a symmetrical polyphase system connected in polygon and having a relatively large number of phases, and a commutator electrically connected with said windings for successively short-circuiting the secondaries of said transformer, said transformer having a sufficiently small co-efficient of leakage induction for each of the last mentioned phases to allow sparkless commutation for the full rated output of the transformer with a fixed angle of commutation.

25. In an electric conversion system, comprising in combination, a source of polyphase current having a given number of phases, a transformer for changing said current to polyphase current having a greater number of phases, and a commutator for converting the last-mentioned polyphase current into practically-unfluctuating direct current, said commutator comprising means for successively short-circuiting the secondaries of said transformer and means for simultaneously connecting or disconnecting at a plurality of points in series the direct current circuit to or from said secondaries in the order necessary for commutation.

26. An electric conversion system, comprising in combination, a source of polyphase current, means for converting the same into practically-unfluctuating direct current and means for simultaneously connecting or disconnecting at a plurality of points in series the direct current circuit to or from said source of polyphase current in the order necessary for commutation.

27. An electric conversion system comprising in combination, a source of polyphase current having a plurality of windings, means for commutating said windings to convert said polyphase current into practically-unfluctuating direct current, means for simultaneously connecting or disconnecting at a plurality of points in series the direct current circuit to or from said source of polyphase current, in the order necessary for commutation, and means for connecting a condenser to each of said windings during the commutation thereof.

28. An electric conversion system, comprising in combination, a source of electrical energy, a transformer having a relatively small number of cores, a primary winding on said cores, a secondary winding having a relatively large number of integral portions on said cores, each integral portion of said secondary winding being distributed in as nearly even a manner as possible throughout the same position in space surrounding its core as is occupied by its inductively-associated primary winding, whereby the leakage inductance of said transformer referred to any one of said integral portions of said secondary winding is rendered very small, connections between said source of electrical energy and said primary winding, a commutator for successively short-circuiting said integral portions of said secondary winding, and connections between said secondary winding and said commutator.

29. An electric conversion system comprising in combination, a source of electrical energy, a transformer having a relatively small number of cores, a primary winding on said core, a secondary winding having a relatively large number of integral portions on said cores, each integral portion of said secondary winding being distributed in as nearly even a manner as possible throughout the same position in space surrounding its core as is occupied by its inductively-associated primary-winding, whereby the leakage inductance of said transformer referred to any one of said integral portions of said secondary winding is rendered sufficiently small to allow sparkless commutation for all loads within the rated output of the transformer with a fixed angle of commutation, connections between said source of electrical energy and said primary winding, a commutator for successively short-circuiting said integral portions of said secondary winding, and connections between said secondary winding and said commutator.

30. An electric conversion system comprising in combination, a source of polyphase current, a transformer having very small leakage-inductance, connections from the primaries of said transformer to said source and means connected with the secondaries of said transformer comprising a collecting device for successively short-circuiting the latter and thereby converting said polyphase current into practically-unfluctuating direct current.

31. An electric conversion system comprising in combination, a source of polyphase current of one system, a transformer having very small leakage-inductance adapted to change said current to polyphase current of a different system, and means comprising a collecting device for successively short-circuiting the secondaries of said transformer and thereby converting the last mentioned polyphase current into practically-unfluctuating direct current.

32. An electric conversion system comprising in combination, a source of polyphase current having a given number of phases, a transformer having very small leakage-inductance adapted to change said current to polyphase current having a greater number of phases, and means comprising a collecting device for successively short-circuiting the secondaries of said transformer and thereby converting said last mentioned polyphase current into practically-unfluctuating direct current.

33. An electric conversion system comprising in combination, a source of polyphase current, a transformer having very small leakage-inductance, connections from the primaries of said transformer to said source and means connected with the secondaries of said transformer comprising a collecting device for successively short-circuiting the latter and reversing the current therein whereby said polyphase current is converted into practically-unfluctuating direct current.

34. An electric conversion system comprising in combination, a source of polyphase current of one system, a transformer having very small leakage-inductance adapted to change said current to polyphase current of a different system, and means comprising a collecting device for successively short-circuiting the secondaries of said transformer and reversing the current therein whereby said polyphase current is converted into practically-unfluctuating direct current.

35. An electric conversion system comprising in combination, a source of polyphase current having a given number of phases, a transformer having very small leakage-inductance adapted to change said current to polyphase current having a greater number of phases, and means comprising a collecting device for successively short-circuiting the secondaries of said transformer and reversing the current therein whereby said polyphase current is converted into practically-unfluctuating direct current.

36. An electric conversion system comprising in combination a source of polyphase electrical energy having a relatively small number of phases, a transformer having its cores numerically equal to the number of said phases, a primary winding for each of said phases, a secondary winding for obtaining a relatively large number of phases, said secondary winding forming a symmetrical polyphase system connected in polygon, a commutating device connected to said secondary winding for successively short-circuiting the integral portions thereof, and a direct current load-circuit connected to said commutating device, each integral portion of said secondary winding being distributed in as nearly even a manner as possible throughout the same position in space surrounding its core as is occupied by the whole of its inductively-associated primary winding whereby the magnetic flux linked with any one of said integral portions of said secondary winding is minimized and the reversal of current in each integral portion of said secondary winding during commutation for all loads within the rated output of the transformer is caused to develop a reactance-voltage sufficiently small to be sparklessly neutralized by the commutation-voltage with a fixed angle of commutation.

37. An electric conversion system comprising in combination a polyphase electric circuit having a relatively large number of phases, a transformer having its cores numerically less than the number of said phases, a primary winding for each of said phases, said winding forming a symmetrical polyphase system connected in polygon, a secondary winding for obtaining a relatively small number of phases, a commutating device connected to said primary winding, for successively short-circuiting the integral portions thereof and a direct current source connected to said commutating device, each integral portion of said primary winding being distributed in as nearly even a manner as possible throughout the same position in space surrounding its core as is occupied by the whole of its inductively-associated secondary winding, whereby the magnetic flux linked with any one of said integral portions of said primary winding is minimized and the reversal of current in each integral portion of said primary winding during commutation for all loads within the rated output of the transformer is caused to develop a reactance-voltage sufficiently small to be sparklessly neutralized by the commutation-voltage with a fixed angle of commutation.

38. An electric conversion system comprising in combination a polyphase transformer having closed magnetic circuits and a relatively small number of cores, a primary winding having its integral portions numerically larger than the number of said cores, said winding forming a symmetrical polyphase system connected in polygon, a commutating device connected to said primary winding for successively short-circuiting the integral portions thereof, a source of direct-current electrical-energy connected to said commutating device, a secondary winding having its integral portions numerically equal to those of the primary winding and its turns numerically different from those of said primary winding, a second commutating device connected to said secondary winding for successively short-circuiting the integral portions thereof, means for rotating both commutating devices at the same speed, and a direct-current load-circuit connected to said second commutating device, each integral portion of said secondary winding being distributed in as nearly even a manner as possible throughout the same position in space surrounding its core as is occupied by the corresponding inductively-associated portion of said primary winding whereby magnetic flux linked with corresponding portions of said primary and secondary windings is minimized and reversal of current in each phase of said windings during commutation for all loads within the rated output of the transformer is caused to develop a reactance-voltage sufficiently small to be sparklessly neutralized by the commutation voltage with a fixed angle of commutation.

39. An electric conversion system comprising in combination a source of polyphase electrical energy having a relatively small number of phases, a transformer having its cores numerically equal to the number of said phases, a primary winding for each of said phases, a secondary winding for obtaining a relatively large number of phases, said secondary winding forming a symmetrical polyphase system connected in polygon, a commutating device connected to said secondary winding for successively short-circuiting the integral portions thereof, and a direct-current load-circuit connected to said commutating device, each integral portion of said secondary winding being so disposed about its core and so inductively interlinked with its associated primary winding that the product of its coefficient of leakage-induction by the rate of current change during the period of current reversal in such integral portion is equal to a reactance voltage sufficiently small to be sparklessly neutralized by the commutation voltage with a fixed angle of commutation for all loads within the rated output of the transformer.

40. An electric conversion system comprising in combination a source of polyphase current having a given number of phases, a transformer for changing said current into polyphase current having a greater number of phases, connections from the primary of said transformer to said source and a commutator for successively short-circuiting the secondaries of said transformer and reversing the current therein, said transformer having such small leakage-inductance that the reactance-voltage developed by such current reversal is substantially equal to the commutation-voltage.

In testimony whereof, I have hereunto subscribed my name this 16 day of Aug., 1912.

SEWALL CABOT.

Witnesses:
PATRICK J. CONROY,
GEO. K. WOODWORTH.